United States Patent
Zoepf

(10) Patent No.: US 12,462,583 B2
(45) Date of Patent: Nov. 4, 2025

(54) METHOD FOR RECOGNIZING ACTIVATED LAMPS AT A VEHICLE

(71) Applicant: Robert Bosch GmbH, Stuttgart (DE)

(72) Inventor: Fabian Zoepf, Geislingen an der Steige (DE)

(73) Assignee: ROBERT BOSCH GMBH, Stuttgart (DE)

( * ) Notice: Subject to any disclaimer, the term of this patent is extended or adjusted under 35 U.S.C. 154(b) by 504 days.

(21) Appl. No.: 18/150,287

(22) Filed: Jan. 5, 2023

(65) Prior Publication Data
US 2023/0222812 A1 Jul. 13, 2023

(30) Foreign Application Priority Data
Jan. 10, 2022 (DE) .................... 10 2022 200 136.2

(51) Int. Cl.
| | |
|---|---|
| *G06V 20/58* | (2022.01) |
| *G06V 10/22* | (2022.01) |
| *G06V 10/764* | (2022.01) |
| *G06V 10/776* | (2022.01) |
| *G06V 10/82* | (2022.01) |

(52) U.S. Cl.
CPC ............ *G06V 20/584* (2022.01); *G06V 10/22* (2022.01); *G06V 10/764* (2022.01); *G06V 10/776* (2022.01); *G06V 10/82* (2022.01)

(58) Field of Classification Search
CPC ...... G06V 20/584; G06V 10/82; G06V 10/22; G06V 10/776; G06V 10/764
See application file for complete search history.

(56) References Cited

U.S. PATENT DOCUMENTS

| | | | |
|---|---|---|---|
| 10,733,465 B2 * | 8/2020 | Wang | G05D 1/81 |
| 11,341,356 B2 * | 5/2022 | Frossard | B60W 60/00274 |
| 11,361,557 B2 * | 6/2022 | Lee | G06V 20/584 |
| 11,807,252 B2 * | 11/2023 | Beaurepaire | B60W 50/14 |
| 12,139,133 B1 * | 11/2024 | Schleede | B60W 10/18 |
| 2019/0092318 A1 * | 3/2019 | Mei | G06N 3/04 |
| 2019/0370574 A1 * | 12/2019 | Wang | G05D 1/0088 |
| 2020/0234066 A1 * | 7/2020 | Lee | G05D 1/0251 |
| 2021/0063578 A1 * | 3/2021 | Wekel | G01S 17/894 |
| 2023/0162508 A1 * | 5/2023 | Xia | B60W 60/00274 382/104 |

FOREIGN PATENT DOCUMENTS

CN 111881739 A 11/2020

* cited by examiner

*Primary Examiner* — Utpal D Shah
(74) *Attorney, Agent, or Firm* — NORTON ROSE FULBRIGHT US LLP

(57) ABSTRACT

A method for recognizing which lamps at a vehicle are activated. The method includes: providing multiple image recordings of candidate areas at the vehicle in which an activated lamp is presumed; converting the image recordings into an intermediate product by executing a recurrent encoder network (ERNN), the output of at least one pass of the ERNN is supplied as input to a further pass of the ERNN, and different image recordings of candidate areas are supplied as input to different passes of the ERNN; assignments of the image recordings of candidate areas are ascertained to classes which represent specific lamps of the vehicle from the intermediate product by executing a recurrent decoder network (DRNN) multiple times, the output of at least one pass of the DRNN is supplied as input to a further pass of the DRNN.

14 Claims, 3 Drawing Sheets

METHOD FOR RECOGNIZING ACTIVATED LAMPS AT A VEHICLE

CROSS REFERENCE

The present application claims the benefit under 35 U.S.C. § 119 of German Patent Application No. DE 10 2022 200 136.2 filed on Jan. 10, 2022, which is expressly incorporated herein by reference in its entirety.

FIELD

The present invention relates to the recognition of which lamps at a vehicle are activated, in particular, for planning the behavior of a following ego-vehicle.

BACKGROUND INFORMATION

In road traffic, it has been customary for quite some time for vehicles to be equipped with brake lights and turn signals. With these lamps, the driver of the vehicle is able to signal to other road users which actions he or she is planning in the near future. It is therefore desirable to also take these useful pieces of information into consideration in driver assistance systems and systems for the at least semi-automated driving, for the planning of future interventions in the driving dynamics of the vehicle.

An exemplary method for recognizing the state of lamps at a vehicle is described in China Patent Application No. CN 111 881 739 A.

SUMMARY

Within the scope of the present invention, a method for recognizing which lamps at a vehicle are activated is provided. The vehicle may, in particular, be a vehicle preceding an ego-vehicle, for example, and the method may then be carried out on board the ego-vehicle.

Within the scope of the method, multiple image recordings of candidate areas at the vehicle are provided, in which an activated lamp is presumed. These image recordings may, in particular, be partial images, for example, which were previously selected from a larger still image or video image.

According to an example embodiment of the present invention, the image recordings are converted into an intermediate product by executing a recurrent encoder network (ERNN) multiple times. In the process, the output of at least one pass of the ERNN is supplied as input again to a further pass. In addition, different image recordings of candidate areas are supplied as input to different passes of the ERNN. The ERNN can thus, for example, be supplied a first image recording as input during its first pass. The second pass may then, for example, receive the output of the first pass, and additionally a second image recording, as input. The third pass may then, for example, receive the output of the second pass, and additionally a third image recording, as input, and so forth.

From the intermediate product, which is obtained after all passes of the ERNN have been completed, assignments of the image recordings of candidate areas to classes are subsequently ascertained by carrying out a recurrent decoder network (DRNN) multiple times. These classes represent specific lamps of the vehicle, such as, for example, rear lights, brake lights, turn signals or rear fog lights. Additionally, it is possible, in particular, for at least one class to be provided, for example, for areas for which the presumption that an activated lamp of the vehicle is present therein proves to be incorrect. Examples of such areas are reflections of foreign light at the vehicle, in particular, for example, at the license plate, which is specifically designed to be reflective.

According to an example embodiment of the present invention, in the process, the output of at least one pass of the DRNN is supplied as input to a further pass of the DRNN. (See, FIG. 1, 131). In each pass of the DRNN, an assignment of the image recording which was processed in this pass of the ERNN to at least one class is ascertained. (See, e.g., FIG. 1, 132). In the first pass of the DRNN, the assignment of the image recording which was supplied to the first pass of the ERNN as input to a class is ascertained. In the second pass of the DRNN, the assignment of the image recording which was supplied to the second pass of the ERNN as input to a class is ascertained, and so forth.

It was recognized that, through the use of a recurrent ERNN and a recurrent DRNN, the task of recognizing all activated lamps which may possibly be present in a still image or a video image of the vehicle may be broken down into a plurality of subtasks. These subtasks may each be completed by one pass of an ERNN or a DRNN, which includes only a small number of neurons. Such an ERNN or such a DRNN may also be executed on hardware which does not provide a particularly powerful CPU and also no special hardware accelerators for the execution of neural networks. In control units for driver assistance systems or systems for the at least semi-automated driving of vehicles, for example, the electrical power consumption and/or the possible heat dissipation is/are limited.

At the same time, the individual image recordings of candidate areas, as a result of the recurrent execution of the ERNN and the DRNN, are not considered in an isolated manner, but are in each case considered in the context of the remaining image recordings. Both when creating the intermediate product and when ascertaining classes from the intermediate product, results which were obtained during the previously carried-out processing with respect to other image recordings are also always reused during the processing with respect to each image recording. By also incorporating the context in the surroundings of the vehicle lamp, activated lamps may be classified particularly reliably, and this may even be achieved from a single image. The recognition of activated lamps using traditional image processing, in contrast, frequently requires multiple chronologically consecutive frames and is accordingly slower.

In one particularly advantageous embodiment of the present invention, the candidate areas are selected based on their luminance and/or color from an image or a video of the front or the rear of the vehicle. For example, such candidate areas may be ascertained and/or tracked by threshold values in luminance and/or color. In this way, all candidate areas for which there is at least an "initial suspicion" that they show activated vehicle lamps may be ascertained very quickly. All these candidate areas may then be sequentially converted into the intermediate product with the aid of the ERNN, and subsequently be analyzed with the aid of the DRNN. Regardless of how many candidate areas there are, the same hardware complexity is always required, just as a supermarket, in principle, also remains functional with only one open cash register, regardless of the number of customers.

According to an example embodiment of the present invention, the image recordings of the candidate areas may be supplied to the ERNN, for example, directly in their raw form as arrays or tensors including intensity and/or color values of pixels. In one particularly advantageous embodiment, the image recordings, however, are condensed into feature vectors which indicate the peculiarity of one or multiple feature(s). These feature vectors are even supplied to the ERNN as input, instead of the image recordings. In this way, the dimensionality of this input may be reduced and, at the same time, also be standardized. Just the standardization is advantageous, since the candidate areas may have very different sizes. For example, an area which includes a rear light and a turn signal, situated next to it, of the vehicle may be considerably larger than an area which randomly reflects the incident light from the street lights in the direction of the camera.

In one further advantageous embodiment of the present invention, candidate areas are selected with the aid of a further neural network from an image or a video of the front or the rear of the vehicle. Such a further neural network may combine the ascertainment of the candidate areas and the extraction of features from these candidate areas in one operation. The further neural network may, in particular, include at least one convolutional layer, for example, which, by applying at least one predefined filter kernel to its input, ascertains a feature map of this input. This feature map may then be supplied to the ERNN as input, instead of the image recordings.

In one further advantageous embodiment of the present invention, positions and/or sizes of these image recordings relative to the vehicle are supplied to the ERNN as input, in addition to the image recordings or feature vectors or feature maps formed thereof. This additional context information may then also be converted by the ERNN into the intermediate product, and subsequently be evaluated by the DRNN. In this way, it is possible, for example, for learned knowledge to be taken into consideration as to the locations at the vehicle at which the occurrence of certain activated lamps may be plausible at all. Turn signals are situated at the two sides of the vehicle, for example, but not in the center.

In one particularly advantageous embodiment of the present invention, an ERNN and/or a DRNN having no more than 100 neurons is/are selected. A network of this size may also be executed on hardware which does not have any resources specifically designed for the execution of neural networks, such as, for example, GPUs, particularly rapid CPUs or a particularly large working memory. At the same time, the network, however, is still flexible enough to be able to manage the particular subtask well, namely the processing of pieces of information from an individual candidate area or the classification of such a candidate area.

Particularly advantageously, according to an example embodiment of the present invention, the image recordings are recorded with the aid of at least one sensor which is carried along by an ego-vehicle. The ego-vehicle is a vehicle whose optimal driving behavior in the more immediate future may depend on which lamps at the vehicle analyzed with the aid of the method are activated. The analyzed vehicle may, for example, be a preceding vehicle or also an oncoming vehicle.

If the brake light is activated, for example, in a preceding vehicle, this indicates that the preceding vehicle is decelerating. The ego-vehicle may then also gently decelerate in time, even before its distance with respect to the preceding vehicle drops below a critical value, and a sudden stronger brake application becomes necessary.

If the turn signal is activated in the preceding vehicle, this shows that the preceding vehicle intends to change lanes or to change the driving direction. When the preceding vehicle intends, for example, to turn right at a right angle, the ego-vehicle has to prepare for the fact that the preceding vehicle will become considerably slower prior to the turning process. The ego-vehicle on its part also has to prepare for stopping behind the preceding vehicle, when the preceding vehicle, on its part, is required to wait compared to other road users, such as pedestrians or bicyclists who want to continue straight ahead. In this regard, starting with the recognition that the preceding vehicle intends to turn, a behavior of road users which are moving straight ahead to the right of the ego-vehicle is relevant for the further planning of the driving dynamics of the ego-vehicle. If the preceding vehicle were not present or did not intend to turn, the behavior of the road users moving straight ahead would not be relevant for the behavior planning of the ego-vehicle.

According to an example embodiment of the present invention, when driving on the expressway, the simultaneous activation of both turn signals (hazard lights) of the preceding vehicle may indicate that this vehicle is approaching the end of a traffic jam or is already situated at the end of a traffic jam. The ego-vehicle is thus already informed about having to decelerate soon, or even stop, at a point in time at which it is not yet able to measure, or is only able to imprecisely directly measure, the speed of the preceding vehicle.

In the case of an oncoming vehicle, the activation of the left turn signal may indicate that this vehicle is preparing to pass another vehicle driving on the traffic lane driven by it and, for this purpose, will utilize the traffic lane presently driven on by the ego-vehicle. At this moment, among others, the speed of the oncoming vehicle, the speed of the vehicle passed by the ego-vehicle, the distance between the ego-vehicle and the oncoming vehicle, as well as evasive options at the roadside are relevant for the assessment of whether the situation is possibly becoming dangerous for the ego-vehicle. As a result of the recognition of the impending passing maneuver already based on the turn signal, valuable seconds may be gained for the decision whether the ego-vehicle, for example, should carry out a braking or evasive maneuver.

In one particularly advantageous embodiment of the present invention, in this way, an activation signal for the ego-vehicle is ascertained, taking the assignments, ascertained by the DRNN, of image recordings to classes representing lamps of the analyzed vehicle into consideration. The ego-vehicle is activated with the aid of this activation signal, which, in turn, may cause an arbitrary suitable intervention in the driving dynamics of the ego-vehicle. The reliable recognition of activated lamps at the vehicle here increases the probability that the intervention in the driving dynamics of the situation detected by the ego-vehicle is appropriate.

The present invention also relates to a method for training an encoder-decoder system made up of an ERNN and a DRNN for the use in the above-described method.

Within the scope of this training method according to the present invention, learning image recordings of areas at a vehicle are provided. These learning image recordings are labeled with setpoint assignments to classes which represent specific lamps of the vehicle. Thus, when a learning image recording is being incorporated into the intermediate product in one of the passes of the ERNN, it is desired that the DRNN in the pass corresponding thereto assigns these learning image recordings to a class corresponding to the setpoint assignment.

From the learning image recordings, assignments to classes are ascertained using the above-described method.

Deviations of the assignments, ascertained with the aid of the DRNN, from the setpoint assignments are assessed based on a predefined cost function. Parameters which characterize the behavior of the ERNN and of the DRNN are optimized, with the goal of the assessment presumably improving as a result of the cost function during the further processing of learning image recordings.

As explained above, this training causes the learning image recordings not be evaluated in an isolated manner, but in each case in the context of the remaining learning image recordings at the same vehicle. As a result, the accuracy of the classification of activated vehicle lamps by the trained encoder-decoder system is enhanced.

In one particularly advantageous embodiment of the present invention, the setpoint assignment for the learning image recording which was processed in the pass of the ERNN corresponding to the respective preceding pass of the DRNN is supplied as input to the second and all subsequent passes of the DRNN. Thus, for example, the setpoint assignment for the first learning image recording which was analyzed in the preceding first pass of the DRNN is supplied as input to the second pass of the DRNN, with the aid of which the assignment for the second learning image recording is to be ascertained. In this way, it is presumed during the training that the assignment ascertained in the preceding pass of the DRNN was correct.

Just the use of the setpoint assignments during further passes of the DRNN causes the success of the training with respect to a certain learning image recording to become more independent of the pass of the DRNN in which an assignment of this learning image recording to a class is ascertained.

In one further advantageous embodiment of the present invention, the order in which the learning image recordings are supplied as input to the various passes of the ERNN is sorted based on a route through locations at the vehicle to which these learning image recordings relate. In this way, the ability of the encoder-decoder system to just evaluate sequences of inputs, including their inner relationships, is optimally utilized.

The method may, in particular, be entirely or partially computer-implemented. The present invention thus also relates to a computer program including machine-readable instructions which, when they are executed on one or multiple computer(s), prompt the computer(s) to carry out one of the described methods. Within this meaning, control units for vehicles and embedded systems for technical devices, which are also able to execute machine-readable instructions, are to be regarded as computers.

The present invention also relates to a machine-readable data medium and/or to a download product including the computer program. A download product is a digital product transferrable via a data network, i.e., downloadable by a user of the data network, which may be offered for immediate download in an online shop, for example.

Furthermore, a computer may be equipped with the computer program, with the machine-readable data medium and/or with the download product.

Further measures improving the present invention are shown hereafter in greater detail together with the description of the preferred exemplary embodiments of the present invention based on figures.

DETAILED DESCRIPTION OF EXAMPLE EMBODIMENTS

Figure 1:
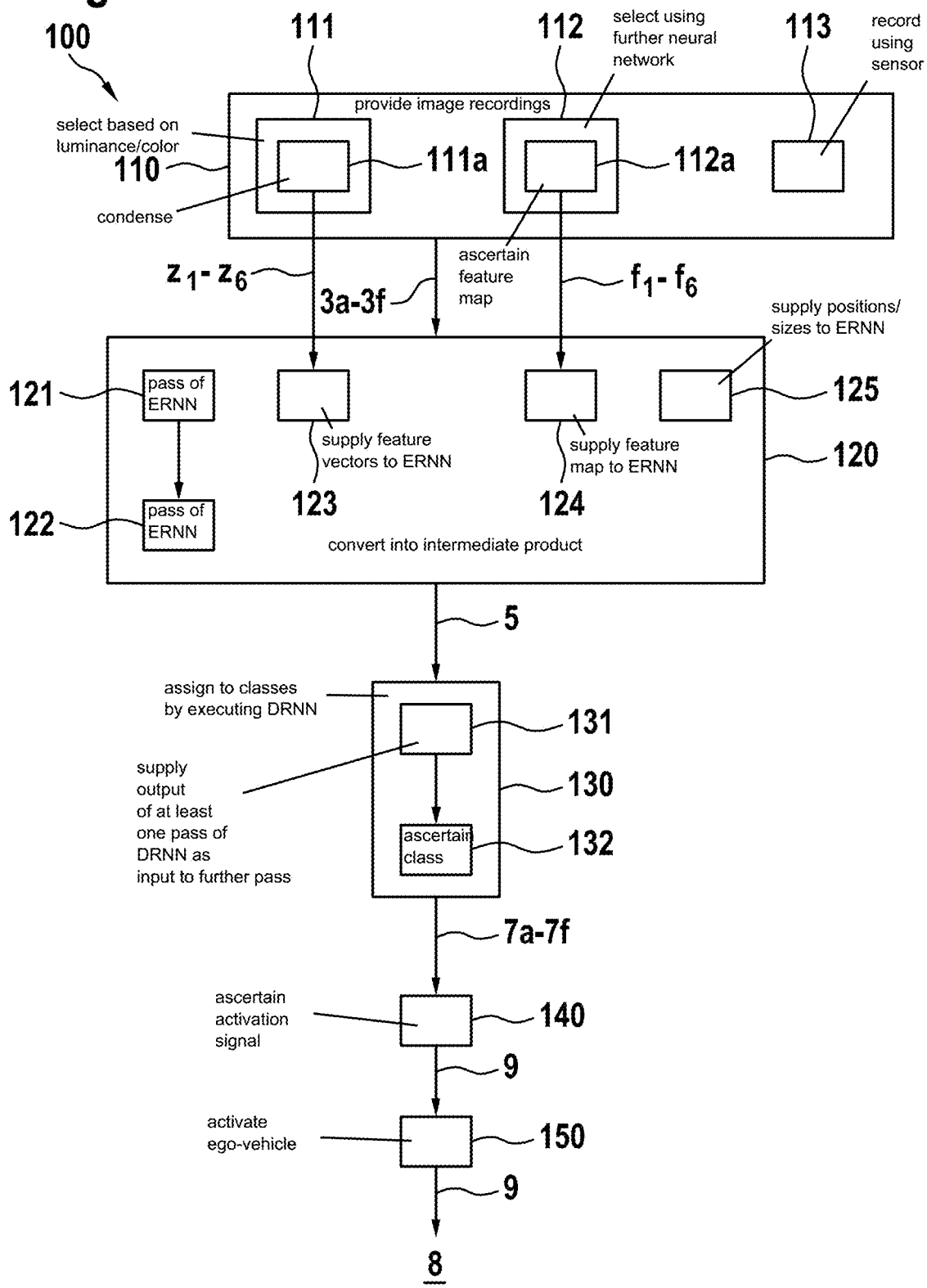
FIG. 1 shows one exemplary embodiment of method 100 for recognizing which lamps 2a, 2b at a vehicle 1 are activated, according to the present invention.

FIG. 1 shows a schematic flowchart of one exemplary embodiment of method 100 for recognizing which lamps 2a, 2b at a vehicle 1 are activated.

In step 110, multiple image recordings 3a through 3f of candidate areas 1a through 1f at vehicle 1 are provided. An activated lamp 2a, 2b is presumed in each case in candidate areas 1a through 1f.

In step 120, image recordings 3a through 3f are converted into an intermediate product 5 by executing a recurrent encoder network (ERNN) 4 multiple times. In the process, according to block 121, the output of at least one pass 4a through 4f of ERNN 4 is supplied as input to a further pass 4a through 4f of ERNN 4. According to block 122, different image recordings 3a through 3f of candidate areas 1a through 1f are supplied as input to different passes 4a through 4f of ERNN 4.

Figure 3:
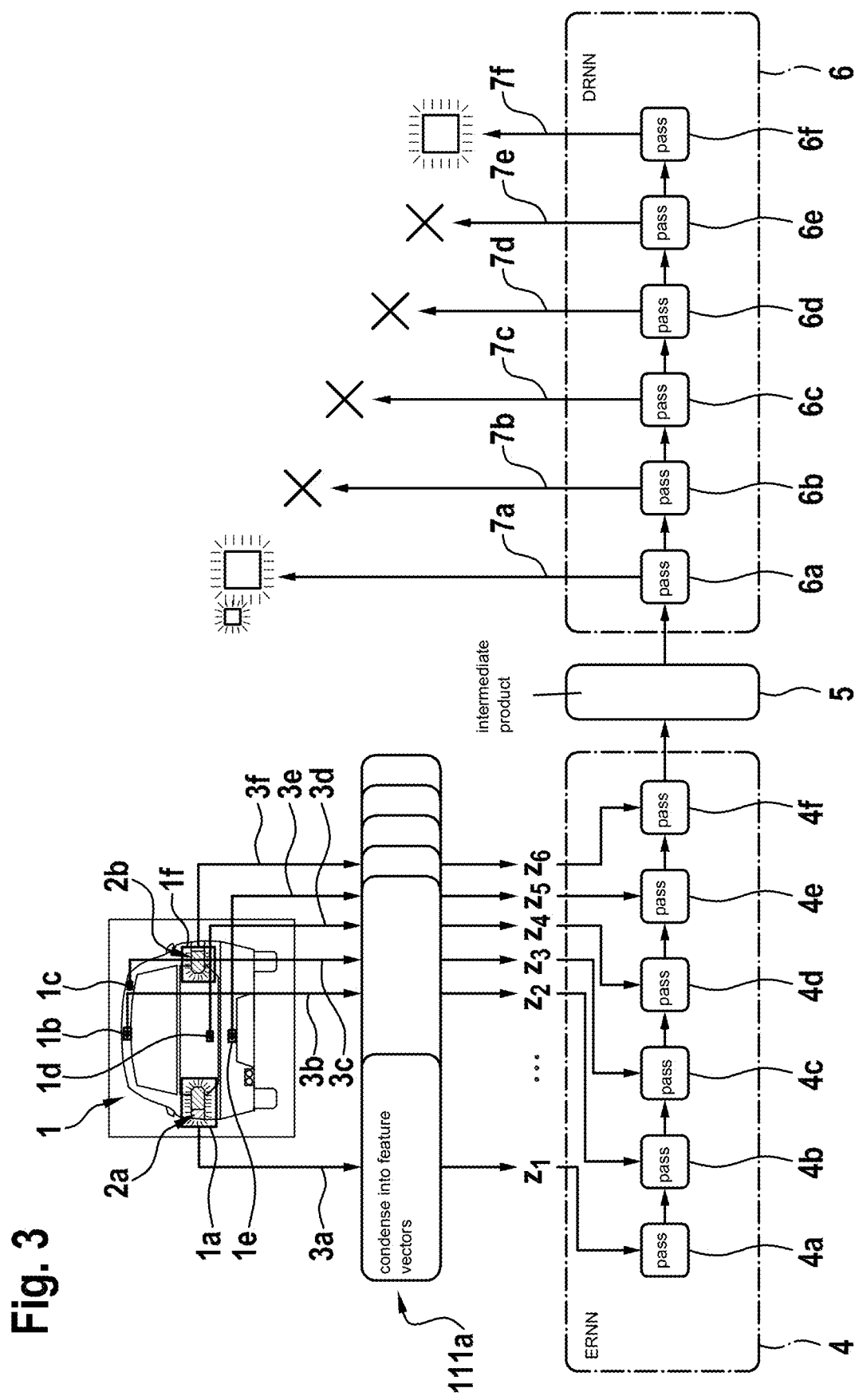
FIG. 3 shows one exemplary use of method 100 on an image of a vehicle 1, according to the present invention.

In step 130, assignments 7a through 7f of image recordings 3a through 3f of candidate areas 1a through 1f to classes are ascertained from intermediate product 5 by executing a recurrent decoder network (DRNN) 6 multiple times. These classes represent specific lamps 2a, 2b of vehicle 1, which is illustrated in FIG. 3.

In step 140, an activation signal 9 is ascertained for ego-vehicle 8, taking assignments 7a through 7f ascertained by DRNN 6 into consideration.

In step 150, ego-vehicle 8 is activated with the aid of this activation signal 9.

According to block 111, candidate areas 1a through 1f may be selected based on their luminance and/or color from an image or a video of the front or the rear of vehicle 1. According to block 111a, image recordings 3a through 3f may then be condensed into feature vectors $z_1$ through $z_6$ which indicate the peculiarity of one or multiple feature(s). According to block 123, these feature vectors $z_1$ through $z_6$ may then be supplied to ERNN 4 as input, instead of image recordings 3a through 3f.

According to block 112, candidate areas 1a through 1f may be selected with the aid of a further neural network from an image or a video of the front or the rear of vehicle 1. According to block 112a, this further neural network may include at least one convolutional layer, which, by applying at least one predefined filter kernel to its input, ascertains a feature map $f_1$ through $f_6$ of this input. According to block 124, this feature map $f_1$ through $f_6$ may then be supplied to ERNN 4 as input, instead of the respective image recording 3a through 3f.

According to block 113, image recordings 3a through 3f may be recorded with the aid of at least one sensor which is carried along by an ego-vehicle 8.

According to block 125, positions and/or sizes of these image recordings 3a through 3f relative to vehicle 1 may be supplied to ERNN 4 as input, in addition to image recordings 3a through 3f or feature vectors $z_1$ through $z_6$ or feature maps $f_1$ through $f_6$ formed thereof.

Figure 2:
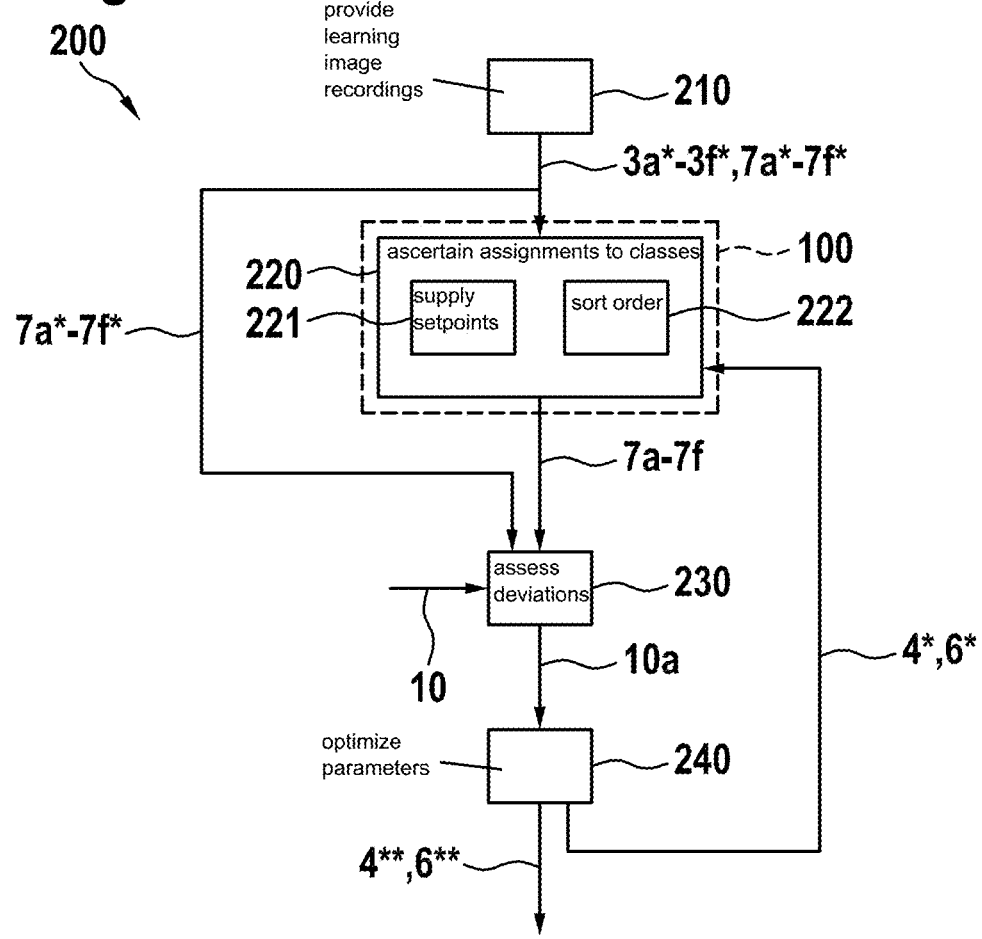
FIG. 2 shows one exemplary embodiment of method 200 for training a system made up of an ERNN 4 and a DRNN 6, according the present invention.

FIG. 2 shows a schematic flowchart of one exemplary embodiment of method 200 for training an encoder-decoder system made up of an ERNN 4 and a DRNN 6 for the use in the above-described method 100.

In step 210, learning image recordings 3a* through 3f* of candidate areas 1a through 1f at a vehicle 1 are provided. These learning image recordings 3a* through 3f* are labeled with setpoint assignments 7a* through 7f* to classes which represent specific lamps 2a, 2b of vehicle 1. At least one class may also represent the case that the respective learning image recording 3a* through 3f* does not include a lamp 2a, 2b of vehicle 1, but that the light from the respective area 1a through if comes from another source.

In step 220, assignments 7a through 7f to classes are ascertained from learning image recordings 3a* through 3f* using the above-described method 100. In the process, according to block 221, setpoint assignment 7a* through 7f* for learning image recording 3a* through 3f* which was processed in pass 4a through 4f of ERNN 4 corresponding to the respective preceding pass 6a through 6f of DRNN 6 may be supplied as input to second and all subsequent passes 6a through 6f of DRNN 6.

In step 230, deviations of assignments 7a through 7f, ascertained with the aid of DRNN 6, from setpoint assignments 7a* through 7f* are assessed based on a predefined cost function 10.

Based on assessment 10a obtained in the process, in step 240 parameters 4*, 6*, which characterize the behavior of ERNN 4 and of DRNN 6, are optimized, with the goal of assessment 10a presumably improving as a result of cost function 10 during the further processing of learning image recordings 3a* through 3f*. The fully optimized states of parameters 4*, 6* are denoted by reference numerals 4 and 6.

According to block 222, the order in which learning image recordings 3a* through 3f* are supplied as input to the various passes 4a through 4f of ERNN 4 may be sorted based on a route through locations at vehicle 1 to which these learning image recordings relate.

FIG. 3 illustrates one exemplary use of method 100 on an overall image of a vehicle 1. Based on the color and luminance, six partial images of candidate areas 1a through if at vehicle 1 are cut out of this overall image as image recordings 3a through 3f. According to block 111a of method 100, these image recordings 3a through 3f are condensed into feature vectors $z_1$ through $z_6$.

Feature vectors $z_1$ through $z_6$ are supplied to various passes 4a through 4f of recurrent encoder network (ERNN) 4. These passes 4a through 4f are shown separately from one another for better illustration. However, physically, always the same neural network is used. In the example shown in FIG. 3, the network is a gated recurrent unit (GRU). First pass 4a only receives feature vector $z_1$ as input. Every further pass 4b through 4f in each case receives the result of the preceding pass 4a-4e as well as a new feature vector $z_2$ through $z_6$ as input. The output of the last pass 4f is intermediate product 5.

Intermediate product 5 is subsequently analyzed in various passes 6a through 6f of recurrent decoder network (DRNN) 6. These passes 6a through 6f are shown separately from one another for better illustration. However, physically, always the same neural network is used. In the example shown in FIG. 3, the network is a gated recurrent unit (GRU). First pass 6a receives intermediate product 5 as input. All further passes 6b through 6f receive the output of the respective preceding pass 6a through 6e as input. Each pass 6a-6f supplies, as output, an assignment 7a through 7f of feature vector $z_1$ through $z_6$, processed in the corresponding pass 4a through 4f of ERNN 4, to one or multiple class(es).

In the example shown in FIG. 3, assignment 7a indicates that image recording 3a shows a rear light and a turn signal as lamp 2a of vehicle 1. Assignments 7b through 7e show that the respective image recordings 3b through 3e do not show a lamp 2a, 2b of vehicle 1, but instead in each case light from another source which is reflected by vehicle 1. This is symbolized in each case by a cross (x). Assignment 7f indicates that image recording 3f shows a rear light as lamp 2b of vehicle 1.

What is claimed is:

1. A method for recognizing which lamps at a vehicle are activated, including the steps:
   providing multiple image recordings of candidate areas at the vehicle in which an activated lamp is presumed;
   converting the image recordings into an intermediate product by executing a recurrent encoder network (ERNN) multiple times, the output of at least one pass of the ERNN being supplied as input to a further pass of the ERNN, and different image recordings of candidate areas being supplied as input to different passes of the ERNN; and
   ascertaining assignments of the image recordings of candidate areas to classes which represent specific lamps of the vehicle from the intermediate product by executing a recurrent decoder network (DRNN) multiple times, the output of at least one pass of the DRNN is supplied as input to a further pass of the DRNN, and in each pass of the DRNN, an assignment of the image recording which was processed in the pass of the ERNN corresponding to the pass of the DRNN is ascertained to at least one class.

2. The method as recited in claim 1, wherein the candidate areas are selected based on their luminance and/or color from an image or a video of the front or the rear of vehicle.

3. The method as recited in claim 2, wherein the image recordings are condensed into feature vectors, which indicate a peculiarity of one or multiple features, the feature vectors being supplied as input to the ERNN instead of the image recordings.

4. The method as recited in claim 1, wherein the candidate areas are selected using a further neural network from an image or a video of the front or the rear of vehicle.

5. The method as recited in claim 4, wherein the further neural network includes at least one convolutional layer, which, by applying at least one predefined filter kernel to its input, ascertains a feature map of the input, the feature map being supplied as input to the ERNN instead of the image recordings.

6. The method as recited in claim 1, wherein positions and/or sizes of the image recordings relative to the vehicle are also supplied to the ERNN as inputs.

7. The method as recited in claim 1, wherein the ERNN and/or the DRNN have no more than 100 neurons.

8. The method as recited in claim 1, wherein the image recordings are recorded using at least one sensor which is carried along by an ego-vehicle.

9. The method as recited in claim 8, wherein:
   an activation signal for the ego-vehicle is ascertained, taking the assignments ascertained by the DRNN into consideration, and
   the ego-vehicle is activated using the activation signal.

10. A method for training an encoder-decoder system made up of an recurrent encoder network (ERNN) and a recurrent decoder network (DRNN), comprising the following steps:
    providing learning image recordings of areas at a vehicle, the learning image recordings being labeled with setpoint assignments to classes which represent specific lamps of the vehicle;
    ascertaining assignments to classes from the learning image recordings by:

providing the image recordings of candidate areas at the vehicle in which an activated lamp is presumed;

converting the image recordings into an intermediate product by executing the ERNN multiple times, the output of at least one pass of the ERNN being supplied as input to a further pass of the ERNN, and different image recordings of candidate areas being supplied as input to different passes of the ERNN, ascertaining the assignments of the image recordings of candidate areas to the classes which represent specific lamps of the vehicle from the intermediate product by executing the DRNN multiple times, the output of at least one pass of the DRNN is supplied as input to a further pass of the DRNN, and in each pass of the DRNN, an assignment of the image recording which was processed in the pass of the ERNN corresponding to the pass of the DRNN is ascertained to at least one class;

assessing deviations of the assignments, ascertained using the DRNN, from the setpoint assignments, based on a predefined cost function; and optimizing parameters which characterize a behavior of the ERNN and of the DRNN, with a goal of the assessment improving as a result of the cost function during the further processing of learning image recordings.

11. The method as recited in claim 10, wherein the setpoint assignment for each learning image recording which was processed in the pass of the ERNN corresponding to the respective preceding pass of the DRNN is supplied as input to the second and all subsequent passes of the DRNN.

12. The method as recited in claim 10, wherein an order in which the learning image recordings are supplied as input to the various passes of the ERNN is sorted based on a route through locations at the vehicle to which the learning image recordings relate.

13. A non-transitory machine-readable data medium on which is stored a computer program including machine-readable instructions for recognizing which lamps at a vehicle are activated, the instructions, when executed by a computer, causing the computer to perform the following steps:

providing multiple image recordings of candidate areas at the vehicle in which an activated lamp is presumed;

converting the image recordings into an intermediate product by executing a recurrent encoder network (ERNN) multiple times, the output of at least one pass of the ERNN being supplied as input to a further pass of the ERNN, and different image recordings of candidate areas being supplied as input to different passes of the ERNN; and ascertaining assignments of the image recordings of candidate areas to classes which represent specific lamps of the vehicle from the intermediate product by executing a recurrent decoder network (DRNN) multiple times, the output of at least one pass of the DRNN is supplied as input to a further pass of the DRNN, and in each pass of the DRNN, an assignment of the image recording which was processed in the pass of the ERNN corresponding to the pass of the DRNN is ascertained to at least one class.

14. One or multiple computers configured to recognize which lamps at a vehicle are activated, the one or multiple computers configured to:

provide multiple image recordings of candidate areas at the vehicle in which an activated lamp is presumed;

convert the image recordings into an intermediate product by executing a recurrent encoder network (ERNN) multiple times, the output of at least one pass of the ERNN being supplied as input to a further pass of the ERNN, and different image recordings of candidate areas being supplied as input to different passes of the ERNN; and ascertain assignments of the image recordings of candidate areas to classes which represent specific lamps of the vehicle from the intermediate product by executing a recurrent decoder network (DRNN) multiple times, the output of at least one pass of the DRNN is supplied as input to a further pass of the DRNN, and in each pass of the DRNN, an assignment of the image recording which was processed in the pass of the ERNN corresponding to the pass of the DRNN is ascertained to at least one class.

* * * * *